July 15, 1969   F. B. CARR ETAL   3,455,042
MILITARY RIBBON HOLDING DEVICE
Filed March 9, 1967
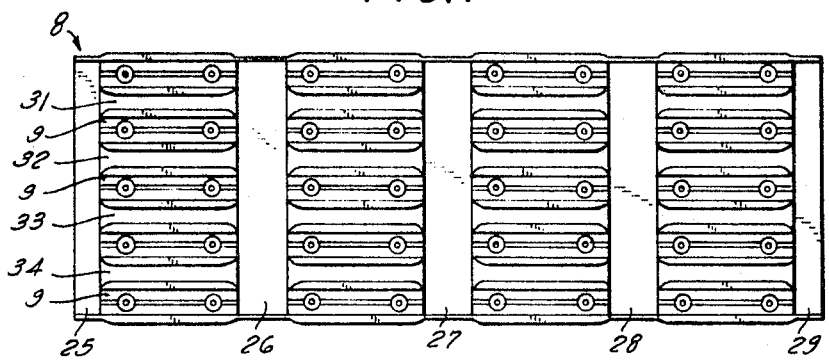
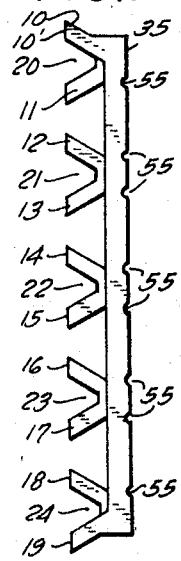
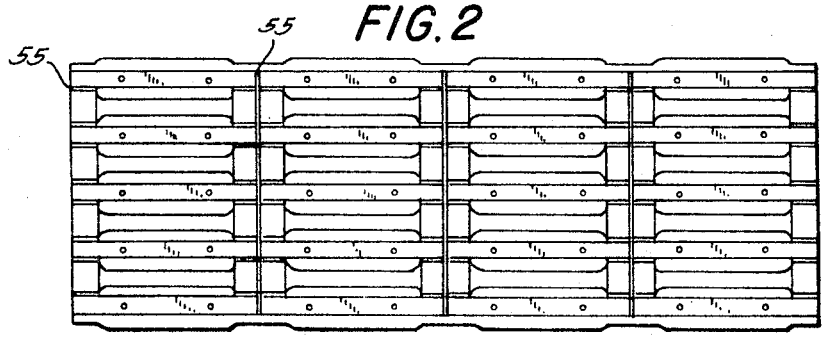
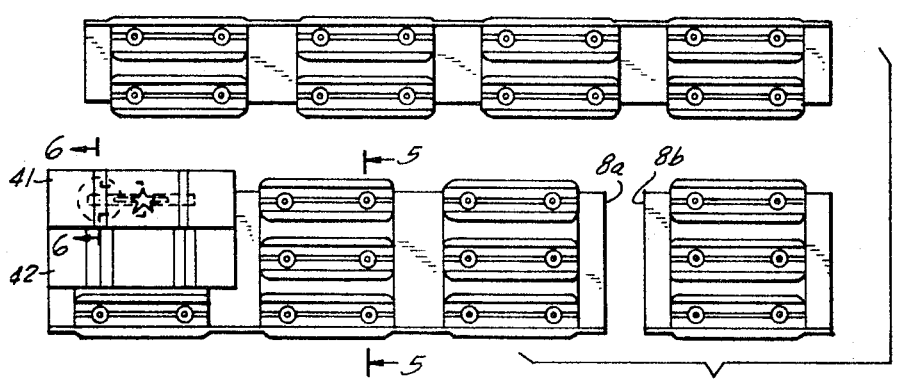
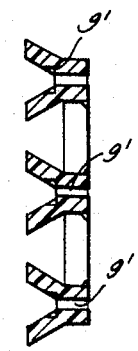
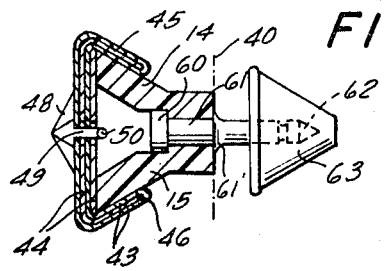
INVENTORS.
FRANK B. CARR
THEODORE CARTER
ROBERT A. RAEBURN
ALBERT J. De CRISTINO
BY
ATTORNEYS United States Patent Office 3,455,042
Patented July 15, 1969

3,455,042
MILITARY RIBBON HOLDING DEVICE
Frank B. Carr, Fullerton, and Theodore Carter, Los Angeles, Calif., and Robert A. Raeburn, New York, and Albert J. De Cristino, Long Island City, N.Y., assignors to N. S. Meyer, Inc., New York, N.Y., a corporation of New York
Filed Mar. 9, 1967, Ser. No. 621,816
Int. Cl. A44c 3/00
U.S. Cl. 40—1.5                                        4 Claims

ABSTRACT OF THE DISCLOSURE

A device for holding military ribbons which can be readily formed and cut by the user into a desired configuration for mounting a plurality of such ribbons in straight parallel uniformly spaced rows so that they may be attached as a single unit to the uniform of the wearer.

BACKGROUND OF THE INVENTION

It has been the custom for many years for those in military service to receive and display ribbons which indicate decorations which they have received and/or theaters of operation in which they have served. These ribbons are mounted upon the wearer's uniform by attachment to the jacket or shirt. Since the ribbons displayed by persons in the military are a source of pride they are worn especially at times when the individual is dressed to appear his best in the military manner. Hence, it is extremely important that these ribbons be displayed in a neat and orderly fashion.

Originally single ribbons were individually pinned or otherwise attached to the uniform of the wearer. Difficulties, however, arose when an individual had more than one of these ribbons to display. In the first intsance, it was cumbersome and time-consuming for the individual to attach a plurality of ribbons. In the second place, in each instance it became necessary for the individual to be certain that the order in which the ribbons were attached to the uniform was the proper order. Also, it was extremely difficult, if not impossible, for the individual to attach the ribbons in a straight row and where several rows were involved it was difficult to maintain each of the rows parallel to the remaining rows of ribbons. This was a particular problem, as stated above, in view of the fact that the ribbons were displayed especially on parade and other important occasions when the military required the absolute in neatness.

Eventually certain devices appeared on the market which allowed the mounting of individudal ribbons in rows on bars. Although this improved the situation, it was not a solution in view of the fact that it was somewhat difficult to attach each of he individual bars when a plurality of rows of ribbons was involved and maintaining the rows parallel, of course, continued to be a problem.

Ultimately various backing devices were designed to which individual or rows of ribbons could be bonded or attached and the user could merely fasten the backing device to his uniform. As a further development of this design, backing devices were provided with a plurality of ribbon bars attached so that the individual could apply the ribbons to the bars as he desired.

The great difficulty with this last mentioned form of maintaining military ribbons in position was that a plurality of devices had to be stocked by the retailer and the user had to be certain to select a device utilizing a back to which the exact spacing on ribbon bars was provided so that his ribbons would completely cover the ribbon holding device. In other words, each model of this type had to be made available in a variety of sizes to hold and support a variety of numbers of ribbons and the user had to be certain that the particular size which he purchased was the appropriate size for the number of ribbons which he had to display.

An additional problem, of course, was that accessories such as stars and various clusters were often attached to the ribbons and it was necessary that the ribbon holding device did not interfere with these accessories on the ribbons. The common method of attaching such accessories to the individual ribbon is to utilize prongs on the accessories and project them through the individual ribbon from the front toward the rear and secure by bending the prongs at the rear of the ribbon to maintain the accessory in position.

SUMMARY OF THE INVENTION

This invention provides a device for use in fastening military ribbons to the uniform of the wearer so that the ribbons will be held neatly in parallel rows and so that the wearer can modify the holding device so that it is sufficient for the number of ribbons which are to be worn. A device for holding military ribbons which can be quickly and easily attached to the uniform of the wearer and to which ribbons can be quickly and readily attached, and one which will not interfere with the utilization of stars or clusters on the individual ribbons.

DESCRIPTION OF THE DRAWINGS

In the accompanying drawings:

FIG. 1 is a front view of a military ribbon holding device constructed in accordance with the teachings of this invention;

FIG. 2 is a rear view of the ribbon holding device shown in FIG. 1;

FIG. 3 is a side view of the ribbon holding device shown in FIGS. 1 and 2;

FIG. 4 is an exploded view from the front of the ribbon holding device shown in FIGS. 1–3, sectioned by a user in order to obtain the proper size holding device for the particular number of ribbons which the user desires to display with a limited number of ribbons shown thereon for purposes of illustration;

FIG. 5 is a partially sectional view taken along the line 5—5 in the direction of the arrows in FIG. 4; and FIG. 6 is a partially sectional view taken along the line 6—6 in the direction of the arrows in FIG. 4.

DESCRIPTION OF THE PREFERRED EMBODIMENT

The military ribbon holding device which is the subject of this invention is shown in the figures and indicated generally by the numeral 8. The device is substantially rectangular in elevation and molded or extruded in a suitable plastic or other relatively rigid material which can be easily cut with a knife.

The device includes a plurality of individual spaced ribbon supporting members 9 each of which in cross section is in Y configuration with the arms thereof forming a V channel open at the front of the member 9 with the single leg thereof extending rearwardly. Five parallel rows of such members 9 appear in the device shown in the figures with four members in each row. The front openings in the members in the top row are indicated by the numeral 20 and the outwardly directed arms by the numerals 10 and 11. The next row of ribbon supporting members from the top has front openings indicated by the numeral 21 and outwardly directed arms indicated by the numerals 12 and 13. The next lower row of members has openings indicated by the numeral 22 and outwardly directed arms indicated by the numerals 14 and 15. The next lower member row has openings indicated by the numeral 23 and outwardly directed arms indicated by the numerals 16 and 17. The lowermost member row has openings indicated by the numeral 24 with outwardly directed arms indicated by the numerals 18 and 19. Each of the arms 10 through 19 terminates in the same plane.

The legs of the members 9 project rearwardly and join with their vertical supporting backing strips 25, 26, 27, 28 and 29.

The vertical backing strips 25 through 29 join the supporting members 9 and maintain them in fixed relationship with respect to each other. There are open spaces between adjacent supporting members which are vertically displaced. Hence, in the first vertical row the individual ribbon supporting members are spaced by openings indicated by the numerals 31, 32, 33, and 34.

The rear surface of the device lies in a single plane indicated by the numeral 35 in the figures which is defined by the rear surfaces of the vertical strips 25, 26, 27, 28, 29 and the rear surfaces or feet of the legs of the individual ribbon supporting members 9. The forwardmost portion of the ribbon holding device also lies in a single plane defined by the front surfaces of the individual ribbon holding devices 9, the portion of such plane defined by a leg being indicated by the numeral 10 in FIG. 3.

The vertical strips 25, 26, 27, 28 and 29, therefore, all lie in the same plane and perform the function of maintaining the various front facing channels in fixed relationship with the remainder of such channels and also of providing a smooth surface which can abut against the uniform of the wearer. Such uniform is indicated in FIG. 6 by phantom lines and given the numeral 40. The front plate of the device, a portion of which has been indicated by the numeral 10' in FIG. 3, is parallel to the plane of the rear of the device indicated by the numeral 35 in FIG. 3.

The campaign ribbons which are to be supported by the holding device 8 are uniform in configuration and two of these, indicated by the numerals 41 and 42, are shown in the figures. Ribbon 41 to which ribbon 42 is identical in configuration consists of ribbon fabric material 43 mounted on a metal backing plate 44. The backing plate 44 has rearwardly and inwardly turned flanges 45 and 46 along the longitudinal edges thereof and the extremities of these flanges are bent back over themselves to confine and cover the edges of the ribbon fabric. The flanges 45 and 46, as shown in FIG. 6 by way of illustration, overlie, engage and grip the outwardly directed arms 14 and 15 of the frontwardly facing channel whose open face is indicated by the numeral 22.

The ribbon 42 is identical to the ribbon 41 and supported by the outwardly directed arms 16 and 17 of the frontwardly facing channel whose open face is indicated by the numeral 23.

The ribbon 41 is shown with a start 48 attached thereto. The star is attached to the ribbon by means of a prong or tie rod 49 which extends from the rear of the star and which is pushed through the ribbon fabric and through a slot 44' formed in the metal backing plate 44. The projecting end of the prong 49 can be clinched over on the back side of the ribbon slide, as shown in FIG. 6 and indicated by the numeral 50. It is noted that the prong and the attaching means lie within the channel 23 and do not touch the member 9. Since there is clearance the ribbon with attached star 48 can be slid freely along the outwardly directed arms 14 and 15 in order to be inserted on the holding device or removed therefrom without interference. Also it is noted that the edges of the ribbon backing plate do not touch the backing strips.

In order to fasten the ribbon holding device to the uniform of a wearer a clamp pin as shown in FIG. 6 is utilized which is made to project through a selected one of the countersunk holes 9' uniformly formed and spaced in member 9. The clamp pin has a cylindrical head 60, a throat 61, shoulder 61' and tapered sharpened end 62, with a depressed annular portion near the point. The tapered end con readily pass through a selected hole 9' and uniform 40 to be maintained in position by releasable clamp button 63. Such clamp buttons are readily known in the art.

The throat 61 is slightly greater in depth than the backing member 9 and slightly smaller in diameter than hole 9' so that it can readily be received within a hole 9' to reside snugly therein. The shoulder 61' causes hole 9' to expand as the pin is inserted until the pin "snaps" into position with throat 61 within hole 9'. So positioned, head 60 and the flat side of throat 61' prevent removal of the pin from member 9.

It is seen, therefore, that the holder with the ribbons mounted thereon can be attached to the uniform of a wearer by pushing pins such as the pin shown in FIG. 6 through the uniform. The releasable clamp button then is inserted over the end of the pin maintaining the pin in position together with the ribbon holding device. It is contemplated that a number of the clamp pins and clamp buttons can be utilized.

The ribbon holding device 8 is provided with a plurality of vertical and horizontal continuous embosses or channels on its rear which are indicated in the figures by the numeral 55. The device, therefore, can be readily sectioned or cut so that a backing of the precise size suitable for the number of ribbons involved can be obtained. Hence, the backing strip is sectioned as shown in FIG. 4 to provide in the uppermost portion of that figure a ribbon holding device having two rows of forwardly facing channels for two rows of ribbons. Likewise, the lower portion of the device can be sectioned vertically along the edges 8a and 8b to provide a ribbon holding device of diminished width. It is obvious, therefore, that with such a military ribbon holding device the user can remove all portions thereof which will be exposed to view as a result of not being covered by ribbons. Hence, a neat appearance can be achieved with the ribbons properly aligned into rows and the rows properly related parallel to remaining rows. In view of the fact that the clamp pins for fastening the device to the uniform of the wearer can pierce the material from which the device is formed the clamp pins can be applied at any position so that there is no difficulty with respect to interference from buttons on the uniform of the wearer or from seams, and also the device can be pinned to the uniform of the wearer at the desired position and incorporating one or more devices in a variety of desired arrangements. Further, the ribbons once attached to the unit will remain in position so that when the wearer wishes to attach all of his ribbons to his uniform he can do so quickly and easily with a resulting neat military appearance.

The material from which the device is made being pliable allows the device to adhere to the contour of the wearer. Also, the device can be dimensioned so that ribbons 41 and 42 can be spaced or abutted as desired.

Thus, among others, the several objects of the invention, as specifically aforenoted, are achieved. Obviously, numerous changes in construction and rearrangement of the parts might be resorted to without departing from the spirit of the invention as defined by the claims.

We claim:

1. A military ribbon holding device for rectangular ribbons of the type having rearwardly and inwardly turned flanges along the longitudinal edges thereof comprising a plurality of individual spaced supporting members each of which is provided with a pair of diverging arms forming a channel which is open at the front, the arms of each of said members being slidably engagable by said inwardly turned flanges on said ribbons and each of said members having a leg extending rearwardly, a plurality of vertical members joining said supporting members at the legs thereof in rows and columns, score lines provided in said vertical members whereby said device may be reduced to a desired size and a plurality of regularly placed holes provided in said device through which a clamp pin is insertable.

2. A military ribbon holding device in accordance with claim 1 having in combination therewith a plurality of clamp pins, each of said clamp pins having a head and shoulder of a diameter greater than the diameter of one of said holes, and a throat between said head and said shoulder having a depth greater than the thickness of said device and a diameter less than the diameter of one of said holes.

3. A military ribbon holding device in accordance with claim 2 in which each of said holes is tapered and said shoulder has a taper to expand a respective hole upon insertion to be received therein by a snap fit.

4. A military ribbon holding device in accordance with claim 1 in which said channel is in the form of an outwardly facing V.

References Cited

UNITED STATES PATENTS

| | | | |
|---|---|---|---|
| 2,707,344 | 5/1955 | Bolognese | 40—1.5 |
| 2,832,161 | 4/1958 | Murphy | 40—1.5 |
| 3,192,655 | 7/1965 | Harn | 40—1.5 |

EUGENE R. CAPOZIO, Primary Examiner

WENCESLAO J. CONTRERAS, Assistant Examiner